United States Patent
Wunderlich (10) Patent No.: US 9,638,919 B1
(45) Date of Patent: May 2, 2017

(54) METHOD FOR REDUCING REFLECTION WHEN OPERATING A HEAD-UP DISPLAY OF A MOTOR VEHICLE

(71) Applicant: AUDI AG, Ingolstadt (DE)

(72) Inventor: Matthias Wunderlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/321,785

(22) PCT Filed: Nov. 20, 2015

(86) PCT No.: PCT/EP2015/002337
§ 371 (c)(1),
(2) Date: Dec. 23, 2016

(87) PCT Pub. No.: WO2016/096079
PCT Pub. Date: Jun. 23, 2016

(30) Foreign Application Priority Data

Dec. 19, 2014 (DE) .......... 10 2014 019 160

(51) Int. Cl.
*G09G 5/00* (2006.01)
*G02B 27/01* (2006.01)
*G02B 27/00* (2006.01)

(52) U.S. Cl.
CPC ..... *G02B 27/0101* (2013.01); *G02B 27/0093* (2013.01); *G02B 2027/014* (2013.01); *G02B 2027/0118* (2013.01)

(58) Field of Classification Search
CPC .......... G06F 3/013; G06F 3/011; G06F 3/012; G09G 2380/10; G09G 2360/141;
(Continued)

(56) References Cited

U.S. PATENT DOCUMENTS 4,978,214 A    12/1990   Kawata
5,128,659 A *   7/1992   Roberts .............. G02B 27/0101
                                                                                340/980
(Continued)

FOREIGN PATENT DOCUMENTS

DE    102004007521 A1    2/2005
DE    102008008878 A1    8/2008
(Continued)

OTHER PUBLICATIONS

International Search Report and Opinion dated Feb. 10, 2016 of corresponding application No. PCT/EP2015/002337; 19 pgs.
(Continued)

*Primary Examiner* — Duc Dinh
(74) *Attorney, Agent, or Firm* — Maier & Maier, PLLC (57) ABSTRACT

A method for reducing reflection when operating a head-up display of a motor vehicle. The head-up display includes a covering disk element and a dimming element for dimming a deflected light beam of ambient light. A control device determines a light beam path of the deflected light beam, determines a current position and orientation of the dimming element, and determines a region to be kept free of the deflected light beam around the eye point of a user. Based on this, the control device determines whether the deflected light beam passes through the area to be kept free. If so, the control device generates a control signal for adjusting a position of the dimming element to dim the deflected light beam with an adjustment device, and the adjustment device adjusts the position of the dimming element depending on the control signal.

8 Claims, 4 Drawing Sheets

(58) Field of Classification Search
CPC ...... G09G 2360/142; G02B 2027/0118; G02B 2027/0178; G02B 27/01; G02B 27/285; G02B 6/0031; G02B 6/0055; G02B 6/0011
USPC .......................................................... 345/7–9
See application file for complete search history.

(56) References Cited

U.S. PATENT DOCUMENTS

| | | | |
|---|---|---|---|
| 7,134,707 B2 * | 11/2006 | Isaac | B60J 3/04 296/97.2 |
| 8,441,734 B2 * | 5/2013 | Dominici | G02B 27/0101 345/7 |
| 8,879,156 B2 * | 11/2014 | Lin | G02B 7/005 359/630 |
| 2003/0169213 A1 | 9/2003 | Spero | |
| 2008/0192358 A1 | 8/2008 | Watanabe et al. | |
| 2011/0007399 A1 | 1/2011 | Dominici et al. | |
| 2014/0307324 A1 | 10/2014 | Cho et al. | |

FOREIGN PATENT DOCUMENTS

| | | |
|---|---|---|
| DE | 102008015997 A1 | 10/2008 |
| DE | 102011016652 A1 | 10/2012 |
| JP | 2005035406 A | 2/2005 |
| JP | 2008268883 A | 11/2008 |

OTHER PUBLICATIONS

German Office Action dated Aug. 31, 2015 of corresponding application No. DE10 2014 019 160.5; 5 pgs.
International Search Report dated Feb. 10, 2016 of corresponding application No. PCT/EP2015/002337; 13 pgs.

* cited by examiner

METHOD FOR REDUCING REFLECTION WHEN OPERATING A HEAD-UP DISPLAY OF A MOTOR VEHICLE

BACKGROUND

The invention relates to a method for reducing reflection when operating a head-up display of a motor vehicle. The head-up display in this case comprises a covering disk element and a dimming element, wherein the dimming element is designed to dim a light beam of ambient light of the motor vehicle deflected by the covering disk element, and it can include for example a mirror bank.

Heads-up displays are used in motor vehicles in order to provide information for the driver directly in his field of view. A head-up display is a display device that projects digital graphic information, which is to say a virtual image, on a reflecting surface in a motor vehicle, for example on a windshield, in the field of view of a user, so that the user can maintain his head position and the view direction. In this case, differently designed mirrors place the virtual image visible on the road.

In order to provide a sufficient protection for a head-up display and for the associated image information against reflections, which can be caused for example by sun beams that may be deflected by the covering disk element and by the windshield into the eyes of the user, a mirror bank is provided on the head-up display that shields the reflection area in the vicinity of the eye point, which is to say around the eyes. For this purpose, the reflection-free area around the eye point is defined, which is to say as the area to be kept free of deflected light. The inner side of the mirror bank is mostly configured with a matte black design in order to absorb light. The covering disk element, which can comprise for example a cover disk or a cover plate, serves in this case to protect the head-up display, creating a light trap together with the mirror bank.

In this manner, the eye point, the cover disk and the disk shape of the motor vehicle exert an influence on the position and the direction in which the mirror bank is used.

In order to deflect ambient light of a motor vehicle, DE 10 2008 015 997 A1 proposes a head-up display in which the virtual image to be projected is passed through a cylindrical lens on the windshield prior to the projection. The lens is inclined towards the projection light to deflect the ambient light.

From US 2011/0007399 A1 is known a head-up display, which has an optical system that is provided with a predetermined level of chromaticization. This results in a reduction of the sunlight on the windshield. External light outside the car is thus reflected or deflected through a surface of a prism in order to prevent occurrences or formation of a ghost image through the external light.

However, the integration of the head-up display under specified technical conditions is often associated concessions with respect to the technical design. So for example, the heads-up display and in particular the mirror bank are in many cases fully or partially visible behind the area of the hood. This is not desirable from the viewpoint of the visibility for the driver and from the viewpoint of the technical design because the driver then looks into a kind of a hole. This is due to a negative position of the mirror bank and to the matte black color of the surface. Although the construction based on prior art can be perceived by the driver as disturbing, so far it has not been possible to accommodate the head-up display in another space suitable for installation.

SUMMARY OF THE DISCLOSURE

The objective of the invention is to enable a construction of a head-up display that is independent on the installation space.

This objective is achieved according to the method of this invention with the head-up display according to the invention and with the motor vehicle according to the invention according to the independent patent claims. Preferred embodiments of the invention are described in the dependant claims.

The invention is based on the idea to provide an adjustable or moveable dimming element. The dimming position of the dimming element can be adjusted depending on whether a deflected light beam of ambient light, for example of sunlight, passes through the region that is to be kept free. The dimming element must therefore be brought to a position enabling dimming only when it is required, which is to say when actual dimming in the motor vehicle is possible. A similar variable dimming element can then be also installed in other control panel areas of the motor vehicle, without having to be newly constructed in this manner. It is then also possible to create a variable reflection-free region in this manner.

The method according to invention serves to reduce the reflection when operating a head-up display in a motor vehicle, wherein the head-up display includes a covering disk element, wherein a head-up display emerges from a housing through which the light beam path of a projection passes. The head-up display further includes a dimming element, for example a mirror bank and/or a cover, which is adapted to dim a light beam of ambient light of the motor vehicle deflected by the covering disk element. The reflection to be reduced is in this case therefore the reflection caused by the deflection of the light beam of the ambient light, for instance a sun beam, or scattered light, that can blind the driver.

A control device of the head-up display, for example a control unit or a microchip that is used to control the head-up display, determines in this case an optical path of the deflected light beam and it detects a current position and orientation of the dimming element. Furthermore, the control unit determines a region to be kept free of deflected beams around the eye point, so called "reflection-free region", and the controlling direction for the detected position of the dimming element, and it establishes whether the deflected light beam leads through the region to be kept free of reflected light. If this is the case, the control device generates a control signal for an adjustment of a position of the dimming element, wherein the deflected light beam is dimmed. An adjustment of the position of the dimming element is carried out so that the deflected light beam then no longer passes through the region that is to remain free. The dimming element thus assumes a dimming position in this manner. The adjustment of the position is carried out with an adjusting device of the head-up display in dependence on the control signal. If the light beam does not pass through the area to be kept free, the dimming element can be brought into a position in which it is no longer in a dimming position. The dimming element can thus be removed from the viewing field of the driver.

The dimming element must therefore be brought into the dimming position only in the case when this is required, so that in all other positions based on the sun conditions, the dimming element can be almost completely blocked from the view of the driver. With the variability of the dimming element it is possible to completely redesign the head-up display also in other control panels, without having to create a new design of the construction of the dimming element. Therefore, this makes it possible to use also other spaces for installation for the head-up display, but also only for the dimming element. For the user, who may perceive the structure of the head-up display as disturbing, the head up-display can thus be mounted in another location where it will not be in the visible area. Thanks to the variability of the dimming element, it is further also possible to design a variable reflection-free region. The design can thus be variable for the eye position of the user and/or it can be also used to extend the reflection-free region.

Furthermore, the head-up display does not need to use any additional, expensive and complex optical system, such as a special lens, or a special prism. In contrast to a head-up system that is provided with a stationary dimming element, it is not necessary to lower the entire head-up display into an installation space in the hood area, which means that the assembly expenses are reduced. Thanks to the ability to shift the position of the dimming element, it can be merged in the cockpit of the motor vehicle.

According to one preferred embodiment of the method according to invention, the control device can determine an environmental parameter, which has an influence on the optical path and/or on the light intensity of the ambient light, in order to determine whether the deflected light beam passes through the area to be kept free of deflected light and/or to determine the light path. A similar environmental parameter can describe for example the light intensity of sunlight, weather conditions and thus the current brightness conditions or sunlight conditions.

The control device can thus react quickly and directly to an external influence. For this purpose, existing sensors and/or already existing communication systems of the motor vehicle can be used according to a further development of this embodiment, wherein the control device can make a determination based on the signals of a sensor device of the motor vehicle describing the environmental parameters and/or a data communication device of the motor vehicle. The signal can be detected for example by a sun position sensor of the motor vehicle, or by an internal data communication device and transferred to the control device. In the case of a data communication device of the motor vehicle, for example information of a weather service can be used as the descriptive signal.

The region to be kept free of the deflected signal depends on the seating position of the user and on the position of the eyes of the user. The sensor device, which can be adapted for example to recognize the eye position, can detect according to another embodiment of the invention the body position conduct and/or an eye position of the user so that the region to be keep free of the deflected light can be determined on this basis. The individual requirements of the user can thus be taken into consideration in this manner, which is to say that the area to be maintained from of the deflected light can be determined on the basis of these conditions. A changed body position of the driver during a ride can thus be also taken into consideration.

In order to design a particularly compact head-up display, the adjustment of the position of the dimming element can be carried out according to another preferred embodiment of the method of this invention by moving the dimming element along a predetermined extension level and/or by turning the dimming element about a predetermined pivoting point.

The user may also feel an additional need to adjust the dimming element during a ride according to a personal feeling. For this purpose, according to another embodiment, the user may carry out adjustment of the position of the dimming element by using the operating control of the user, for example by means of an interface, which is performed depending on the received operating control signal.

For example with motor vehicles that are not equipped with a suitable sensor device, the determination of the optical path of a deflected light beam can be performed on the basis of a navigation route predetermined by a navigation device. This enables a proactive control of the dimming element and a timely dimming process.

If the deflected light beam passes through the region that needs to remain free, an additional control signal can be generated with the control device, which can be used to adjust a position of an additional cover for dimming of the deflected light beam with the adjustment. A position of the cover, which is located in a dimming position, can be also adjusted depending on the control signal. Additional protection for dimming is provided in this manner, and said cover can be also integrated with an installation space that is as compact as possible.

The objective defined above can be also achieved with a head-up display that includes a head-up display, as well as a dimming element, an adjustment device and a control device, which are designed to realize the method in accordance with the invention according to one of the embodiments described above.

The objective defined above is also achieved with a motor vehicle containing a head-up display according to the invention. A head-up display according to the invention does not necessarily need to be arranged in a hood above the instrument panel, since it may be also built for example in another location, such as the inner lining of the motor vehicle. This additionally also makes it possible to avoid the need to have the head-up display 12 built in by the manufacturer, since it can be built in also by the user. Both of the advantages mentioned above can thus be obtained for the head-up display also for the motor vehicle according to the invention, preferably an automobile, such as for example a personal automobile.

BRIEF DESCRIPTION OF THE DRAWINGS

The invention will be explained next in more detail with reference to the accompanying figures one more time on a concrete embodiments thereof. The descriptions of the embodiments below relate to preferred embodiments of the invention. However, the described components of the embodiment represent individual features that are independent of each other and that should be considered as such, as they can be used independently to further develop the invention, both individually and in other combinations of structural components of the invention than those shown here. Moreover, the described embodiments can be also complemented by other features than the features that have been already described. Functionally identical elements are zlabeled with the same reference numerals. The figures show the following.

DETAILED DESCRIPTION OF THE DRAWINGS

Figure 1:
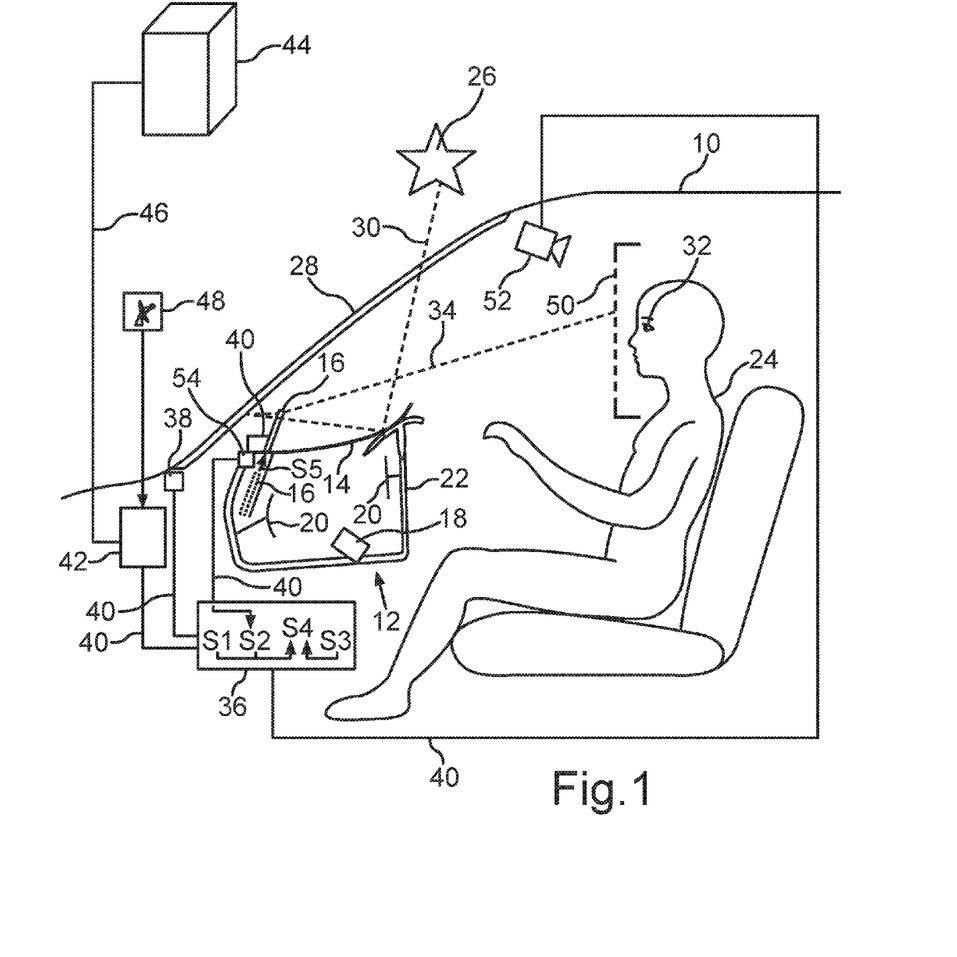
FIG. 1 a schematic sketch of an embodiment according to the invention.

The principle of the method according to the invention will now be illustrated with reference to the embodiment of FIG. 1. FIG. 1 shows a motor vehicle 10, preferably an automobile, such as for example a personal automobile. The motor vehicle 10 comprises a head-up display 12, which is provided with a covering disk element 14 and with a dimming element 16, for example for a mirror bank. The mirror bank, used here by way of an example, can be in this case configured for instance in such a way that it has a matte black surface for absorbing light. The covering disk element 14 can here be designed for instance as a transparent covering disk, which allows through passage of projection from a projection device 18 of the head-up display 12 and at the same time enables deflection of ambient light. The head-up display in FIG. 1 shows for illustration purposes the projection device 18, such as a projector, as well as two optional mirrors 20 for deflecting the projection beams. The head-up display 12 can in this case also include a housing 22 and it can be arranged in a hood of the interior lining part of the motor vehicle 10.

The dimming element 16 can be configured for example as a mirror bank, or as a cover, or as a mirror bank/cover combination. The dimming element 16 can be arranged in the resting position, for example inside the housing 22.

FIG. 1 also shows a user 24 of the motor vehicle 10 and an ambient light source 26, for example the sun, whose light shines through a windshield 28 of the vehicle 10 and, for example in dependence on the sun position, can blind the user 24 due to the reflection of the sunlight 30. Depending for example on the sun position, the light beam 30 can be deflected for example by the covering disk element 14 in such a way that it will hit the windshield 28 and then it will be deflected again into an eye 32 of the user 24. The blinding is illustrated in FIG. 1 with a dotted line illustrating the light beam path 34 entering via the light beam 30 into the eye 32.

This beam path 34 of the deflected light beam 30 is determined according to the deflected light beam 30 with a control device 36 of the head-up display 12. The control device 36 can be designed for example as a microchip or a microcontroller of the head-up display 12, or as a control unit of the head-up display 12. In order to determine the beam path 34 (process step 1), the control device 36 can for example receive a signal of a sensor device 38 of the motor vehicle 10, wherein the sensor device 38 comprises for example a sun sensor, which is to say a sensor that can determine the direction and/or the intensity of and/or the duration of the sun rays. The signal of the sensor device 38 can then be transmitted for example via a wireless or a wired communication link 40 from the sensor device 38 to the control device 36. As an example of a wired communication link 40 can be mentioned for example a CAN bus ("Controller Area Network Bus"), or another serial bus system known to a person in the art. The example of the sensor device 38 of FIG. 1 can include for example a solar sensor arranged on a motor bonnet or on a side mirror of the motor vehicle. In addition or as an alternative, the control device 36 can receive a signal of a data communication device 42 of the motor vehicle 10, wherein the data communication device 42 of the motor vehicle 10 can include for example a GPS receiver as a navigation device, or an internet-capable communication device of the motor vehicle 10. The latter makes it possible to receive for example weather data from a data server 44 that is external to the motor vehicle, which can be transmitted for example via an internet connection 46. If the data communication device 42 is designed for example as a navigation device, it can receive a satellite signal 48 and determine on this basis a location of vehicle 10.

For this purpose, the dimming element 16 can be coupled via a wireless or wired communication link 40 with the control device 36, wherein the actual position and/or the actual orientation of the dimming element 16 can be described for example with the signal of a position sensor of the dimming element 16 and transmitted to the control device 36. The control device 36 can determine the current position and the current orientation (S2) for example on the basis of this signal.

The control device 36 is further adapted to detect a body position and/or eye position, for example on the basis of a signal of a sensor device 52, of the user 24 in order to determine a region of 50 cm to be kept free of deflected light for the eye point 32 of the user 24 (S3). This sensor device 52 can be designed for example as a stereo camera and/or as an eye position sensor, and it can be attached for example to the roof lining of the motor vehicle 10. The region to be kept free of deflected light beams is the area in which scattered light could occur that could blind the user 24 and therefore should be kept free of scattered light and/or reflections. The measurements of the area to be kept free in the region 5 can be a predetermined value in the area behind the control device 36, which can be obtained for example in the area of the head, or for example in the area with a radius of for instance 20 cm around the eye point 32 of the user 24. The region 50 to be kept free here depends in particular on the height of the user 24, as it is detected on the basis of the signal of the sensor device 52 with the control device 26, which determines the body position and the position of the eyes of the user 24.

In this case, the sensor device 52 for detection of the position can detect for example the spatial coordinates of the eye point 32 of the user 24 in a system of coordinates, in which for example the inner space in the motor vehicle 10 can be detected. This system of coordinates can be for example programmed in advance for position recognition in the sensor device 52 based on a reference object for position determination in the inner space. The current position and/or the current orientation of the dimming element 16 and of the determined region 50 is detected by the control device 26 on the basis of the determined beam path, which determines whether the deflected light beam 30 passes through the region 50 to be kept free (S4). It is also possible to use for this purpose the information about a position of the covering disk element 14, in which the light beam 30 is deflected as shown in the example in FIG. 1.

Additionally or as an alternative, the control device 26 can take into account an environmental parameter, wherein the environmental parameter is affected for example by the position of the sun and/or the intensity of the light. This environmental parameter can be described for instance with a signal of the sensor device, which describes for example the sun position, or it can be a signal of the data communication device 43 indicating for example weather information. From the weather information, the control device can for determine example whether sun is shining at all and whether the ambient light is in fact strong enough to generate a reflection.

If the result of this process is that the deflected light beam 30 passes through the region 50 to be kept free, the control device 36 generates a control signal to set a position of the dimming element 16. The position is in this case a position in which the dimming element dims the light beam 30, which is also referred to as a dimming position, or it is a resting position, in which the dimming position is no longer located in the field of view of the user. For this purpose, the control device 36 transmits the control signal to an adjustment device 54 of the head-up display 12. The adjustment device is in this case a device or an apparatus that is designed to alter the position of the dimming element 16 depending on the control signal, for example with a motor of the adjustment device 54.

FIG. 1 shows an example of a first position of the dimming element 16 in which the dimming element 16 is indicated by a dotted line. The adjusting device 54 be operated in order to set the dimming position for example by means of a motor with a cable, which can for example move the dimming element 16 from a resting position (as indicated by the dotted line) to a dimming position (as indicated by the solid line).

Figure 2:
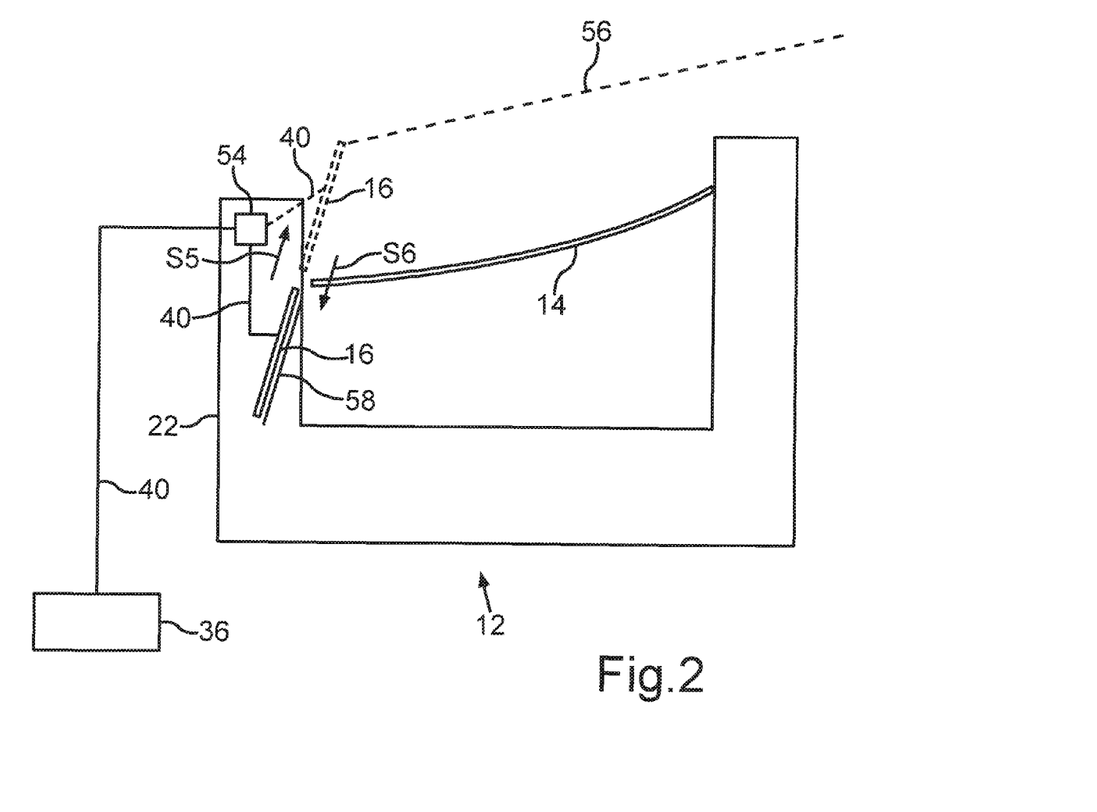
FIG. 2 a schematic sketch of another embodiment of the method according to the invention, FIG. 3 a schematic sketch of a third embodiment of the method according to the invention, FIG. 4 a schematic sketch of another embodiment of the method according to the invention.

The adjusting device 54 can be operated for example with an electrical and/or mechanical and/or pneumatic mechanism for adjustment of the dimming device 16. This can be carried out for example by means of a toothed rack construction, a locking device, or a clamping device. The named devices for adjusting the position of the dimming element 16 are suitable for a particularly preferred embodiment, in which the setting of the position of the dimming element 16 can be performed by moving the dimming element 16 along a predetermined plan of extension, for example along a rail 58. This embodiment is illustrated again specifically in FIG. 2. By means of a similar moving mechanism, the dimming element 16 can be moved from a first position in the head-up display 12, in which it is driven into the housing 22 (shown by the solid line), into a dimming position (shown by the dotted line in FIG. 2), in which the dimming element 16 is located in the field of vision 56 of the user 24. The head-up display 12 of FIG. 2 is in this case illustrated for clarity without the projection device 18, or the mirror 20. FIG. 2 also shows an example of an optional rail 58, along which for example the dimming element 16 can be moved. When this is required, which is to say when the beam path 34 of the ambient light no longer passes through the region 50 to be kept free, the dimming element 16 can be guided back again from the dimming position into the resting position.

Figure 3:
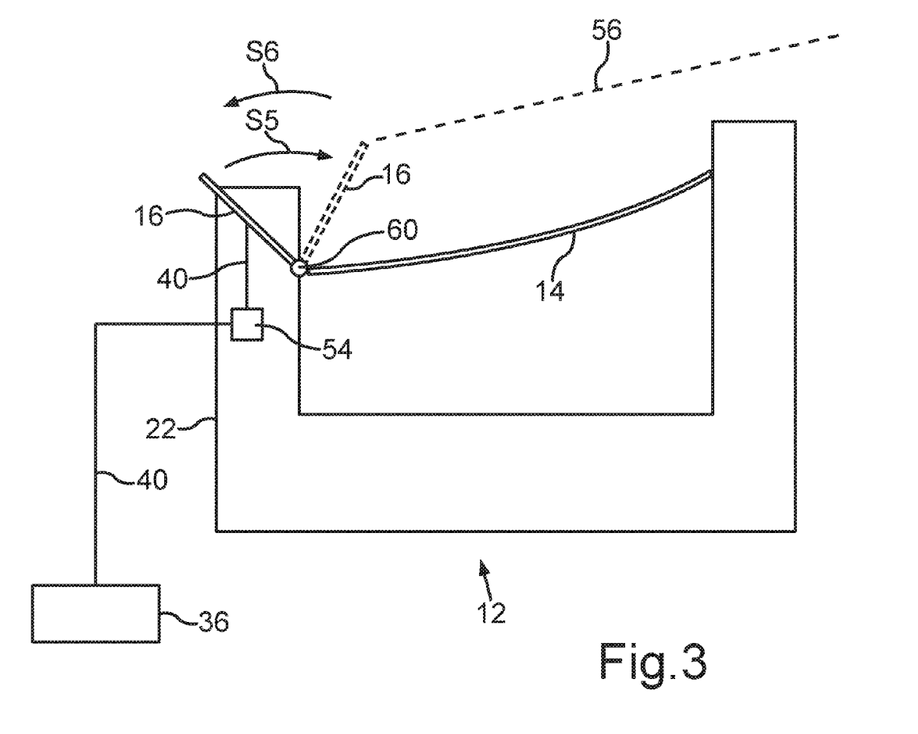

FIG. 3 shows another practical example of another preferred embodiment of the adjustment mechanism of the dimming element 16. The differences from the example shown in FIG. 2 will be explained next. According to the example shown in FIG. 3, the adjustment of the position is performed by turning the dimming element 16 about a predetermined pivot point 60. In a resting position, the dimming element 16 can be for example folded in the housing 22 of the head-up display 12. For this purpose can be used for example a correspondingly shaped recess provided in the housing 22. A motor of the adjustment device 54 can for example turn the dimming element 16 about the pivot point 60. This embodiment represents a preferred practical example because only a small motor would be needed for this embodiment. The motor can then for example move a crank, a cable or a crankshaft.

Figure 4:
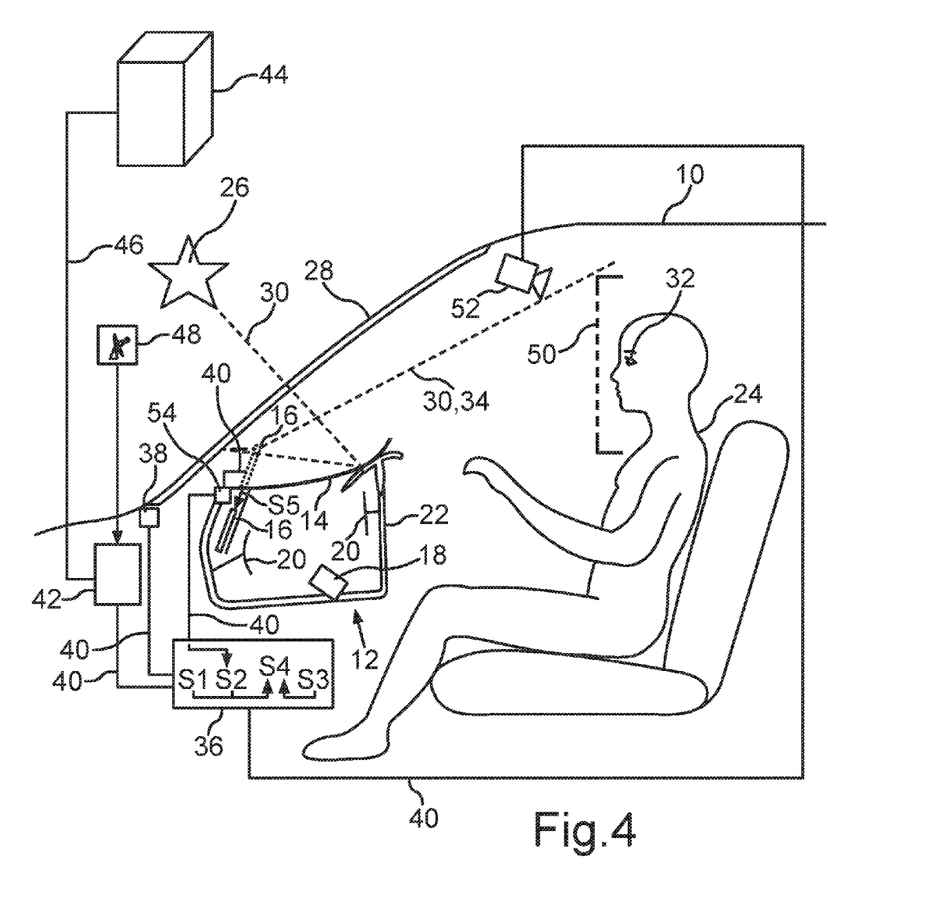

FIG. 4 shows another embodiment of the method according to the invention. Only the differences from the already described method of FIG. 1 will be explained below.

The example in FIG. 4 shows the light conditions in the vehicle 10, which may be present after a change of an example of the position of the sun. The sun is here a source of ambient light 26 that is now for example lower in the sky.

The light beam 30 thus strikes the covering disk element 14 at a different incidence angle. Therefore, the optical path 34 is changed in this manner so that after the deflection of the light beam 30 by the windshield 28, the light beam can no longer pass through the area 50 to be kept free. When this is determined by the control device 36, the control device 36 can generate a control signal that can affect the conduct of the dimming element 16 so that it is moved from the dimming position (shown by the dotted line) to the resting position (shown by the solid line of the dimming element 16). This can occur, as was already described for example in FIG. 2 and FIG. 3, by moving the dimming element for example in a slot suitably designed for this purpose in the housing 22 (S5).

The user 24 can also be provided with the option to select in accordance with the invention adjustment of the position of the dimming element 16 for example via an interface of an infotainment system. The control signal can be generated depending on the operating action, for example with a push button. Furthermore, the data communication device 42 may also include a navigation device, for instance a navigation apparatus, and the beam path 34 can be predicted on the basis of a programmed navigation route. For this purpose can be employed the relevant environmental parameters and/or information about the time of travel that is provided by the control device.

The embodiments described above illustrate the principle of the invention, namely providing an adaptive dimming element 16, preferable a mirror bank, with the capability for adjustment on the head-up display 12.

FIG. 1 in this case illustrates how the adjustment of the dimming position of the dimming element 16, which can be for example a mirror bank, can prevent a reflection of sun beams into the eye 32 of the user 24, for example with a high position of the sun in the sky. When the position of the sun in the sky used in the example is changed and the beam path 34 of the light beam 30 is moved for example outside of the region 50 to be kept free, which is to say the so called "reflection-free region", the dimming element 16 can be for example moved again into a resting position (FIG. 4).

The user 24 may under some circumstances also perceive the cover of the head-up display as disturbing. In this case, it can be for example a cover that incorporates the head-up display 12 in the cockpit of the motor vehicle 10, which can thus also be located above the dimming element 16. This cover can be mounted according to another embodiment of the invention in the area of the dimming element 16 on the dimming element 16 (not shown in FIG. 1), so that it is also moved from the field of view of the user 24.

The dimming element 16 can be also adjusted by means of sensor technology provided on the motor vehicle 10, which is to say by means of a sensor device 38 and/or for example information transmitted via GPS and/or on the basis of the example of the sun conditions and/or weather data, for example with a mirror bank that is equipped with corresponding kinematics in such a manner so that it can be positioned as a visible wall depending on the sun conditions.

It is also possible that the sun beams in the example make it possible to move and/or turn the dimming element 16, so that the dimming element 16 is moved or turned in such a way that the view of the corresponding area (of the hole in the light trap) is prevented or reduced. The dimming element 16 is in this case preferably adjusted by means of a pivot point 60 (FIG. 3) and/or by means of a pushing mechanism (FIG. 2).

An adjustment option is thus provided in this case to make it possible to prevent or reduce the visibility of the dimming element 26 for the user 24.

The following advantages are therefore obtained:

The dimming element 16 can be brought into the so called "worst case position" only when this is required, which is to say in the position in which the user 24 would be blinded without the dimming element, so that for example under all other sun position conditions, the view of the user 24 of the dimming element 16 will be blocked or reduced.

The variability of the dimming element 16 makes it possible to integrate as much as possible the head-up display 12 in other control panels without having to create a new design for the construction of the dimming element 16.

The variability of the dimming element 16 makes it possible to create a variable design of the region 50 to be kept free, which is to say the region to be kept free of reflections, for example variable depending on the position of the eyes of the user 24, while also making it possible to extend the region to be kept free of reflections.

The invention claimed is:

1. A method for reducing reflection while operating a head-up display of a motor vehicle, the head up display having a covering disk element, through which a projection beam path emerges from a housing of the head-up display, and a dimming element that is adapted to dim a light beam deflected by a covering disk element of the motor vehicle, comprising the steps of:

determining a light beam path of the deflected light beam;
   detecting a current position and an orientation of the dimming element;
   determining a region to be kept free of the deflected light beam around an eye point of a user of the vehicle;
   determining, depending on the determined light beam path and on the detected position of the dimming element, whether the deflected light beam passes through the region that must be kept free; and
   if the deflected light beam passes through the area to be kept free, generating a control signal for setting a position of the dimming element for dimming the deflected light beam with an adjustment device of the head-up display, and adjusting a position of the dimming element with the adjustment device depending on the control signal.

2. The method according to claim 1, further comprising: determining an environmental parameter exerting an influence on the light beam path and on a light intensity of the ambient light with the control device in order to determine the light beam path, and determining whether the deflecting light beam passes through the area to be kept free.

3. The method according to claim 2, wherein the control device determines the environmental parameters on the basis of a signal describing environmental parameters of a sensor device of the motor vehicle and of a data communication device of the motor vehicle.

4. The method according to claim 1, wherein a body position and an eye position of a user is determined with a sensor device in order to determine the area to be kept free.

5. The method according to claim 1, wherein the adjustment of the position of the dimming element is performed by moving the dimming element along a predetermined extension level and by turning the dimming element along a predetermined pivot point.

6. The method according to claim 1, further comprising: receiving a control operation of the user for adjusting the position of the dimming element; and generating a control signal depending on the received control operation.

7. The method according to claim 1, further comprising: determining the light beam path of the deflected light beam by predicting the light beam path on the basis of a navigation route predetermined by a navigation device.

8. The method according to claim 1, wherein
if the deflected light beam passes through the region to be kept free, a control signal is generated to adjust a position of a cover in order to dim the deflected light beam with the adjustment device, and
the position of the cover is adjusted with the adjustment device in dependence on the control signal.

* * * * *